United States Patent [19]
Whalen-Shaw

[11] Patent Number: 5,654,050
[45] Date of Patent: Aug. 5, 1997

[54] LAMINATED PLAYING CARD

[75] Inventor: Michael Whalen-Shaw, Circleville, Ohio

[73] Assignee: The United States Playing Card Company, Norwood, Ohio

[21] Appl. No.: 594,252

[22] Filed: Jan. 30, 1996

[51] Int. Cl.⁶ ................................................. B32B 9/00
[52] U.S. Cl. ..................... 428/35.7; 428/53; 428/142; 428/147; 428/161; 428/162; 428/195; 428/203; 428/204; 428/339; 273/292; 273/293
[58] Field of Search ............................ 428/35.7, 53, 339, 428/195, 142, 147, 161, 162, 204, 203, 424.6; 273/292, 293, 152

[56] References Cited

U.S. PATENT DOCUMENTS

| | | | |
|---|---|---|---|
| 326,678 | 9/1885 | Seedhouse | 273/152 |
| 484,798 | 10/1892 | Hyatt | 428/76 |
| 2,012,288 | 8/1935 | Roon | 273/152 |
| 2,545,804 | 3/1951 | Buller | 40/10 |
| 2,932,913 | 4/1960 | Hannon | 40/2.2 |
| 3,667,759 | 6/1972 | Barr | 272/152.1 |
| 4,244,582 | 1/1981 | Raees et al. | 273/293 |
| 5,226,664 | 7/1993 | Bodkin, Sr. | 273/293 |
| 5,226,665 | 7/1993 | Huang . | |

Primary Examiner—P. J. Ryan
Assistant Examiner—Abraham Bahta
Attorney, Agent, or Firm—Dinsmore & Shohl LLP

[57] ABSTRACT

Disclosed is a playing card (12) comprising a base layer (22) of a paper stock material. The base layer (22) is coated on opposite sides with opaque paper coatings (36, 38). The coatings (36, 38) are printed with graphics (18, 20). The base layer (22) is then laminated with top and bottom clear, plastic films (24, 26) on top of the printed coatings (36, 38). The films are high or medium gloss fills and provide a Tappi gloss in the range of about 85° to 105°. The films are mechanically embossed with embossments (48). The embossments (48) provide a static slip in the range of about 7° to about 15° and a Tappi gloss in the range of 50° to 85°. The embossments (48) reduce gloss without significant loss in ink density, color, or image distinctness.

29 Claims, 2 Drawing Sheets

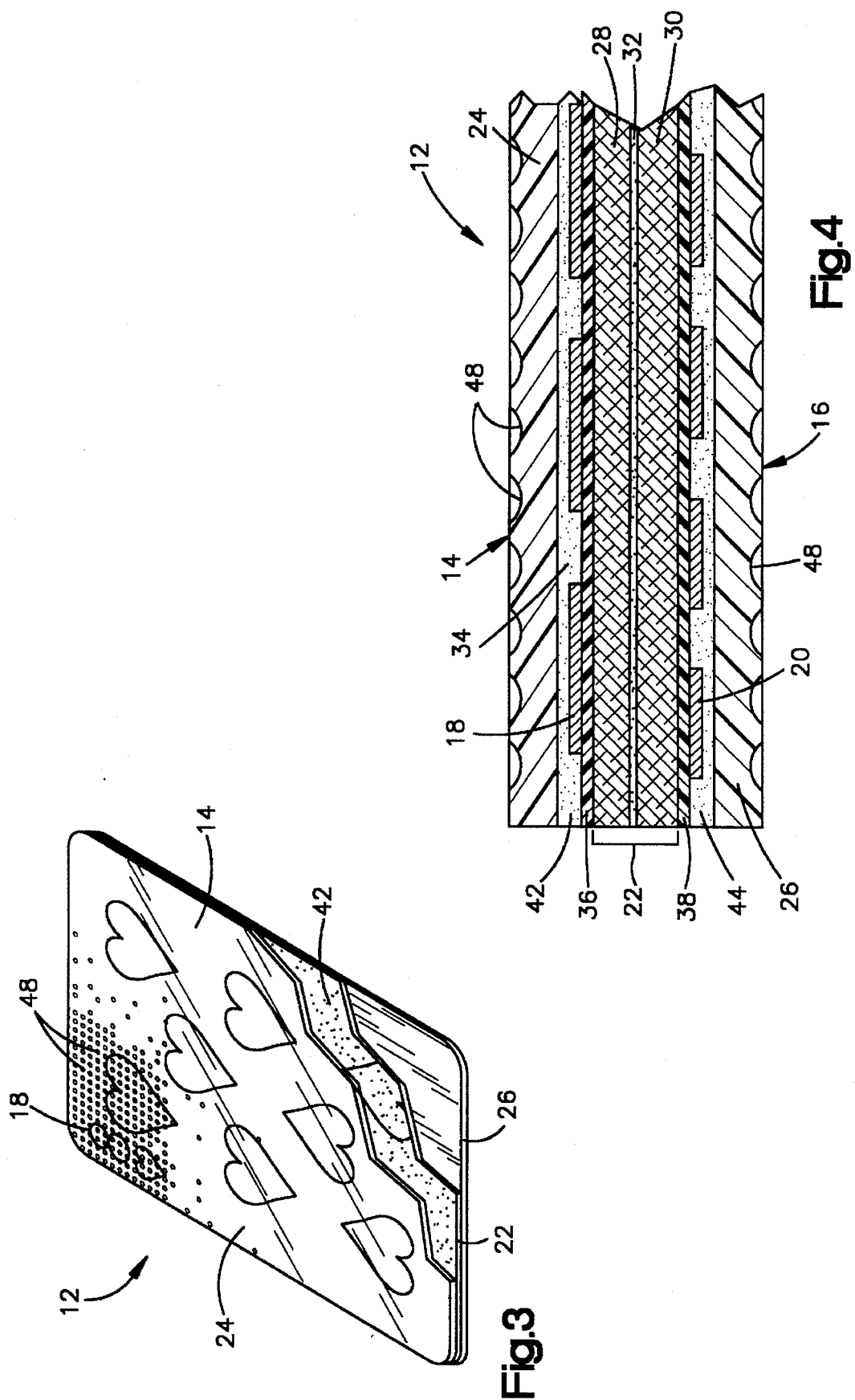

LAMINATED PLAYING CARD

TECHNICAL FIELD

The present invention relates to a laminated card. The present invention is particularly applicable to a playing card, and more particularly to a game card.

BACKGROUND OF THE INVENTION

The term "playing card" refers to a category of cards which includes sports cards, trading cards, and game cards. Playing cards are traditionally manufactured from a plastic or paper base. Paper based cards generally comprise a paper substrate which is coated and then printed and then top-coated. Plastic cards are generally manufactured using a polyvinyl acetate or a polyvinyl chloride opaque film which is printed and then top-coated. It is also known to laminate a plastic film onto a paper base to manufacture a card such as a trading card.

Playing cards, particularly game cards, require certain functional characteristics, such as durability, resistance to marking, washability and stiffness. The cards also require certain aesthetic characteristics such as visual appearance.

Plastic cards excel in durability characteristics, namely oil, water, abrasion and stain resistance. They are difficult to mark and have good washability characteristics for reuse. However, plastic cards have exceptionally poor stiffness which is known in the art as snap.

Paper based playing cards, on the other hand, have excellent stiffness. The excellent stiffness of paper based playing cards provides for ease in handling, shuffling and dealing. The durability of paper based playing cards, however, is less than that for plastic cards.

The aesthetics of a playing card generally concern its visual appearance. Preferably, the cards should not have too high a gloss as to provide an irritating glare. The art work on the card must have sufficient visible ink density and gloss as to portray the intended image and not appear washed out.

A playing card, particularly a game card, should also have a certain amount of static slip to avoid having one card stick with respect to another.

DESCRIPTION OF THE PRIOR ART

U.S. Pat. No. 2,932,913 to Hannon discloses a laminated card having a center paper layer and outer, clear laminated polyester films on opposite sides of the paper layer. The polyester films improve wear, life of the card, and tear resistance. The paper layer is printed on opposite sides prior to lamination.

U.S. Pat. No. 2,012,288 to Roon discloses a shellac coating on a paper base. The shellac coating is polished to provide slip. This makes the coating glossy. The coating is then mechanically modified to make it light diffusing and reduce glare.

U.S. Pat. No. 5,226,665 to Huang discloses an all plastic card having raised strips and raised portions other than the strips to provide anti-stick properties.

U.S. Pat. No. 3,667,759 to Barr discloses a laminated playing card having a flat plastic front panel in which the value and suit indicia are in bas-relief.

U.S. Pat. No. 5,226,664 to Bodkin discloses a laminated card construction with embossed raised areas to provide slip between the cards. The embossing is localized and does not provide gloss reduction in most of the card.

Other patents of interest include U.S. Pat. No. 4,244,582 to Raees, et al. and U.S. Pat. No. 484,798 to Hyatt.

SUMMARY OF THE INVENTION

The playing card of the present invention comprises a base layer of a paper stock. The base layer is preferably coated on opposite sides with top and bottom paper coatings. The coatings are printed. High or medium gloss clear plastic films are laminated, preferably to the opposite sides, over the printed coatings. At least one of the films is mechanically embossed in an effective amount to reduce the gloss of the film to a value within the range of 50° to 85°, as determined using Tappi Gloss Procedure 480. The embossment is also effective to provide good static slip.

It was unexpectedly found that a high gloss or medium gloss film, even if embossed to reduce the gloss to an acceptable value, achieves a clarity of image which is essentially as good as the image clarity prior to lamination.

In addition, the laminated cards of the present invention have a durability and a washability equivalent to that of a plastic card, and a stiffness, at essentially the same basis weight, of a paper card and substantially better than that of a plastic card.

The laminated cards of the present invention preferably have a static slip in the range of 7° to 15°.

A preferred embossment in the present invention is a repetitive pattern of small closely spaced indentations in the plastic film. The pattern preferably is uniformly applied across the face of said at least one side.

The present invention is particularly applicable to a game card.

BRIEF DESCRIPTION OF THE DRAWINGS

Further features of the present invention will become apparent to those skilled in the art to which the present invention relates from reading the following specification with reference to the accompanying drawings, wherein:

FIG. 3 is a perspective view of the game card of FIG. 1 with portions of the game card broken away to illustrate construction of the game card; and FIG. 4 is an enlarged, schematic, sectional view of a portion of the game card of FIG. 1 showing additional features of the game card.

DESCRIPTION OF A PREFERRED EMBODIMENT

In the present application, the terms "film" and "layer" are used interchangeably, and are to be distinguished from a "coating". The terms "film" and "layer" refer to a preformed discrete member which has a discernable thickness and opposed, planar, parallel surfaces. A coating, at its interface with a substrate, in contrast, has an irregular surface in which material of the coating adapts to the geometry of the substrate, for instance by flowing into pores of the substrate. A coating is not preformed.

Also, in the present application, reference is made to a number of tests conducted on specimens of the present invention and the prior art and to data obtained in the tests. The following is a list of the tests and units of measurement which are obtained in the tests.

PPS refers to Parker Print Surface Roughness and is measured in microns.

Brightness is measured using a General Electric Corporation Brightness Meter.

Gloss is determined using a gloss meter and Tappi Gloss Measuring Procedure 480 and is measured in degrees. The gloss is measured at an angle of 75°.

Stiffness is determined on a Gurley Stiffness Machine using Tappi Procedure 543 and is measured in milligrams.

Static slip is measured by placing a pair of cards on an adjustable incline and determining the angle at which one card slips with respect to the other. The static slip is measured in degrees.

Water absorption is the standard two minute Cobb Test using Tappi Procedure 441. The test area is 6.5 sq. cm. and the absorption is stated in terms of pounds of water absorbed in two minutes per 3300 ft.$^2$ of material tested.

Ink density is measured using a Greytag Densitometer.

Figure 1:
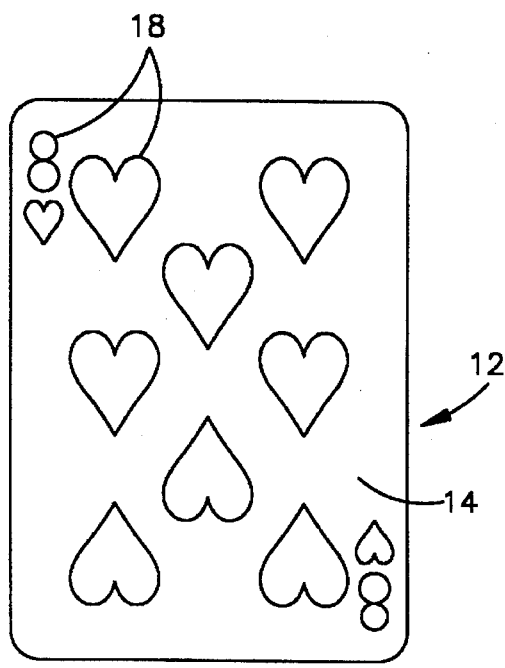
FIG. 1 is a plan view of the face side of a game card in accordance with the present invention.
Figure 2:
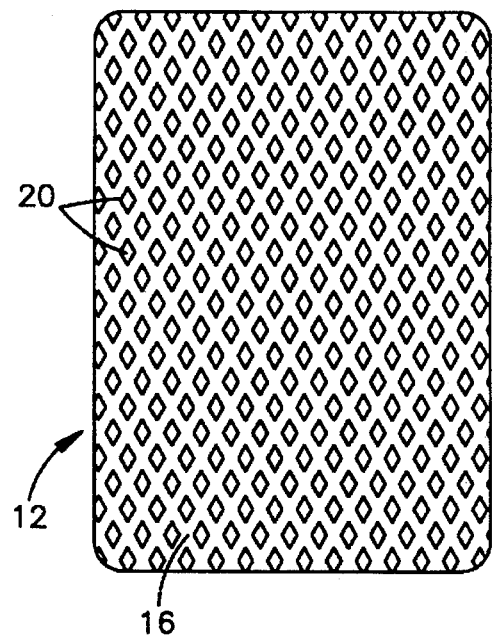
FIG. 2 is a plan view of the back side of the game card of FIG. 1.

Referring to FIGS. 1 and 2, a game card 12 is illustrated. The card 12 comprises a face side 14 (FIG. 1) and a back side 16 (FIG. 2). The face side 14 (FIG. 1) contains a printed design (pips) and indicia 18, and the back side 16 (FIG. 2) contains a printed design 20. It will be understood by those skilled in the art that the game card can have a design without indicia on both sides, or other graphics.

Referring to FIG. 3, the game card 12 of the present invention is a laminated construction. The construction comprises a base layer 22, a top layer 24, and a bottom layer 26. The base layer 22 is a paper stock material, and the top and bottom layers 24, 26 are clear preformed plastic films. The top and bottom films 24, 26 are laminated to the base layer 22 by a suitable adhesive or other means. In FIG. 3, adhesive 42 is shown between base layer 22 and top film 24.

In FIG. 3, it can be seen that the design and indicia 18 which are printed on the base layer 22 are visible through the top film 24. The design and indicia 18 are also visible through the adhesive 42 which is only a thin coating of adhesive and is not opaque.

FIG. 3 also shows that the base layer 22 is opaque and printing on the bottom side of the base layer 22 is not visible in the view of FIG. 3.

Additional details of construction of the game card of FIGS. 1, 2 and 3 are illustrated in FIG. 4.

In the drawing of FIG. 4, the thicknesses of the layers 22, 24, and 26 and other structures are exaggerated for purposes of illustration. In actual practice, the card of the present invention has a total thickness of about 1/64 inch and the thicknesses of the respective layers are correspondingly small.

The base layer 22 of the laminated card of the present invention is a game card paper stock material. It will be understood by those skilled in the art that the term "paper", for purposes of the present application, means any cellulosic or non-cellulosic fibrous material prepared from fibers of wood, cotton, a synthetic material, or combinations thereof as is well known in the paper making art.

The base layer 22 is a generally conventionally laminated construction which comprises plys 28 and 30 and adhesive 32 between plys 28 and 30. The adhesive 32 generally comprises an adhesive matrix material, such as a polyvinyl acetate adhesive, and a non-translucent filler, such as carbon black, to make the adhesive 32 opaque. This prevents one side of the game card from being visible on the opposite side. It is understood that the base layer 22 can, if desired, be a solid pulp construction.

The base layer 22 in the present invention preferably has a reduced caliper and reduced basis weight compared to the basis weight and caliper of paper stock material normally used in the game card art. In a conventional two-ply paper stock material used in the game card art, each ply may have a caliper of about 5.5 to 6.5 mils. and a basis weight of about 70 to 80 lbs/3300 ft$^2$. In the present invention, each ply 28, 30 preferably has a caliper in the range of about 4.5 to about 5.5 mils and a basis weight of about 60 to about 70 lbs/3300 ft$^2$. It is understood that the caliper of the combined layer 22 will be about twice that of each ply 28, 30. The basis weight of the combined layer will be slightly more than twice that of each ply 28, 30 due to the weight of the adhesive 32.

The purpose of the reduced caliper and weight of the plys 28, 30 is to accommodate the caliper and weight added by the laminated films 24, 26. Because the base layer 22 is thinner and of less basis weight compared to a conventional paper stock material, its stiffness will be correspondingly less. However, as will be shown, this is compensated for by the increased stiffness obtained from laminating three layers 22, 24 and 26 together.

The base layer 22, prior to laminating with films 24, 26, is coated on the face side 14 with a top paper coating 36 and on the back side 16 with bottom paper coating 38. The coatings 36, 38 of the present invention are typical substantially opaque paper coatings applied to a paper base, on a paper coating machine.

An example of a suitable paper coating is one which comprises (on a weight basis) 50% ground calcium carbonate ("Hydrocarb", Omya, Inc.), 50% kaolin clay ("Ultrawhite", Engelhard), and 16% based on pigment weight, of a polyvinyl acetate binder ("Resyn 1190", National Starch Co.).

Typically these constructions are supercalendared to achieve a caliper of about 10.4 mils plus or minus 0.4 mils and a high quality printable surface typical in the art.

The coatings 36, 38 are then printed with printing 18, 20. The printing 18, 20 in the present invention is an ink printing typical in the game card art. For making game cards, good quality printing is desirable. This means providing a good image ink density, for instance, more than about 1.8, as measured using a Greytag Densitometer. Generally, the ink density will be in the range of about 1.8 to 2.4.

The printing 18, 20 can be standard solid colors or process colors which are mixtures of standard solid colors.

In the present invention, the gloss of the coatings 36, 38 and of the printing 18, 20 is not critical. Generally, the printing 18, 20 will have a higher gloss than the coatings 36, 38.

The films 24, 26 are then laminated onto the printed coatings. Any means by which the films 24, 26 can be permanently adhered to the printed coatings can be used. In the illustrated embodiment, the films are laminated to the printed coatings by the use of adhesives 42, 44. Other means can be used, such as extrusion of the films onto a base, or heat sealing. All such means are within the scope of the term "laminating".

In FIG. 4, the adhesives 42, 44 are applied to the coatings 36, 38 following printing. The amount of adhesive used is very small and only of sufficient thickness and continuity to bond the top and bottom films 24, 26 to the base layer 22. Preferred adhesives are thermoplastic. Examples of suitable adhesives are Pentaflex 30-5100, 30-6200, 36-5991, Duro-Lam 34-4270, Duro-Flex 38-5036, 38-5050, 38-5044, available from National Starch & Chemical Company. The adhesives are capable of providing a plastic to paper coating bond. It should be understood that the adhesives can be applied to the films 24, 26, or the films 24, 26 can be self-bonding similar to "Scotch Tape"®, and provided with a silicone release liner.

If desired, a suitable primer coat can be applied to the face and back sides 14, 16 following printing. The purpose of the primer coat is to promote bonding between the printing 18, 20 and the adhesives 42, 44. An example of a suitable primer coat is Algan 3022N primer available from Algan Corporation.

The top and bottom films 24, 26 are then laminated into place. Laminating films are obtainable as low gloss, medium gloss, and high gloss films. The top and bottom films 24, 26 are preferably a clear, thermoplastic material and preferably have a high gloss. A medium gloss film can also be used. Use of a high or a medium gloss film provides excellent clarity and transmission of light so as to allow little, if any, distortion in the printed image. Preferably, the films 24, 26 provide a relatively high gloss, after lamination, in the range of about 80° to 105° as determined on a Tappi Gloss Meter using Tappi Gloss Procedure 480.

A preferred plastic film is a clear thermoplastic polyester material. Useful, clear thermoplastic films in the present invention include polyvinyl chloride, polyacrylate, styrene acrylate, and polyethylene terephthalate ("Mylar", E.I. DuPont de Nemours & Co.).

The films typically have a low light absorptivity, a low refractive index, and a caliper in the range of about 0.2 mils to 2 mils.

Figure 1A:
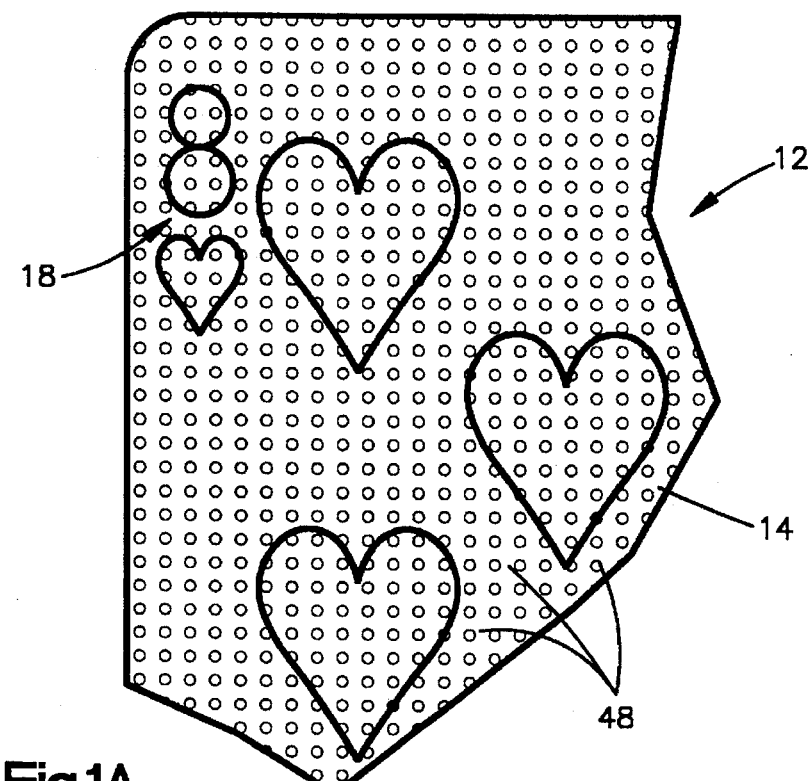
FIG. 1A is an enlarged view of a portion of the game card of FIG. 1 illustrating the embossment on the game card of FIG. 1.

The plastic films 24, 26 in the present invention are then mechanically embossed, preferably on both the face and back sides 14, 16, with embossment 48 as shown in FIGS. 1A, 3 and 4. By "mechanically embossed", it is meant that the embossing is applied mechanically using an embossing apparatus, for instance, in the nip of a roll machine following conventional procedures. In FIGS. 3 and 4, the embossment 48 is a repetitive pattern of closely spaced indentations which are aligned vertically and horizontally. The embossments extend substantially uniformly across the face of each side of the game card 12. The indentations are discernible to the naked eye when the viewer is alerted to their presence. The indentations have a depth and frequency effective to cause scatter of light.

A gloss within the range of about 50° to 85° is considered to be an acceptable gloss, one that does not produce an irritating glare for the person viewing the cards. The indentations in the present invention are effective to reduce the gloss to the range of 50° to 85°.

The present invention is not limited to the geometry of the embossments 48 shown in the drawings. Any relatively uniform repetitive pattern which covers the entire face of the card, which is barely discernible or not discernible, and which scatters light and reduces the gloss over the entire surface of the card to the range of 50° to 85°, will suffice.

An advantage of the present invention is that the gloss is relatively uniform over the entire face of the card. The gloss is not necessarily uniform on a standard printed card, for instance, a plastic card. On a plastic card, the gloss can vary between differently colored areas, or between imaged or non-imaged areas, depending upon the gloss of the ink or the coating used. In the present invention, the imaged and non-imaged areas can be low gloss or high gloss, and can have different glosses. However, following lamination with a medium or high gloss film, the gloss becomes essentially the same for all areas, being dependent primarily on the gloss of the film.

The embossment of the present invention is also effective to provide the game cards with good static slip characteristics. A slip in the range of about 7° to 15° is considered acceptable.. A preferred slip is in the range of about 10° to 15°.

The following Example illustrates the present invention.

EXAMPLE

A base stock was prepared prior to lamination of the base stock with plastic films. The base stock was itself a coated and printed, laminated two-ply paper stock material similar to a conventional paper game card, as described above. The base stock had the following characteristics given in Table I:

TABLE I

| Basis Weight--lbs/3,300 ft² | 167.6 |
| --- | --- |
| Moisture--% | 6.7 |
| Caliper--mils | 10.4 |
| PPS (front)--μ | 4.14 |
| PPS (back)--μ | 4.01 |
| Brightness--% reflectance (front) | 84.66 |
| Gloss-degrees | 38.24 |
| Stiffness--mg | 4668 |

The base stock was laminated on opposite sides with one-half mil-thick high gloss polyethylene terephthalate films marketed by E.I. DuPont de Nemours Company under the trademark "Mylar". Following lamination, the cards were embossed on both sides with a repetitive continuous pattern similar to that shown in FIGS. 1A, 3 and 4, across the face of each side. The embossments were spherical indentations made in the surface of the films in the nip of a roll machine. Each indentation had a depth of about 20 microns. The frequency of the indentations was 344 per square centimeter. The embossments were visible to the naked eye if the viewer was alerted to their presence.

The following Table II gives characteristics of the finished product. In Table II, data is also given for a standard coated and printed paper game card and a standard plastic game card for purposes of comparison. The plastic game card was a "Kem" card made of a polyvinyl acetate material. The "Kem" card was not mechanically embossed. A plastic card cannot normally be mechanically embossed because of the brittleness of the card and its susceptibility to cracking. The standard paper game card was embossed on the surface of each side with a repetitive pattern similar to the pattern used in the laminated cards of the present invention.

In Table II, the values given are average values (Avg.) and standard deviation (σ).

TABLE II

EMBOSSED LAMINATED CARD
vs
STANDARD PAPER CARD
vs
PLASTIC CARD

| | Embossed Laminated | | Standard Paper Card | | Plastic Card | |
| --- | --- | --- | --- | --- | --- | --- |
| | Avg. | σ | Avg. | σ | Avg. | σ |
| Basis Weight-- lbs/3,300 ft² | 208.6 | 1.6 | 188.8 | 1.4 | 254.6 | 14.3 |
| Moisture--% | 4.0 | 0.3 | 4.6 | 0.1 | 4.0 | 0.1 |
| Caliper--mils | 11.9 | 0.1 | 11.3 | 0.2 | 12.2 | 0.3 |
| PPS (face)--μ | 6.80 | 0.30 | 6.81 | 0.18 | 6.79 | 0.38 |
| PPS (back)--μ | 6.68 | 0.49 | 6.51 | 0.26 | 7.93 | 0.33 |
| Slip-degrees | 12.9 | 1.2 | 7.0 | 0.4 | 10.5 | 0.6 |
| Cobb--lbs/ 3,300 ft² | 0.5 | 0.4 | 50.9 | 6.3 | 3.4 | 3.4 |
| Stiffness--mg | 4845 | 324 | 5290 | 89 | 2400 | 103 |

In the above Table II, it can be seen that the laminated game card of the present invention had a basis weight of about 208 lbs/3300 ft² compared to about 188 lbs/3300 ft² for the standard paper game card, and about 254 lbs/3300 ft² for the plastic card. This means that the card of the present invention was only slightly heavier than the standard paper game card, and much lighter than the plastic game card.

The caliper of the card of the present invention was about the same as the caliper of the standard paper game card and the caliper of the plastic game card.

Despite the reduced weight of the laminated game card of the present invention, compared to the plastic game card, the laminated game card had a much higher stiffness, namely 4845 mg compared to 2400 mg for the plastic game card. The stiffness of the card of the present invention was comparable to that of the standard paper game card.

Surprisingly, the laminated game card of the present invention had a Cobb water absorption of about 0.5 lbs, which was better than the 3.4 lbs for the plastic game card, and substantially better than the 50.9 lbs for the standard paper game card.

The laminated card of the present invention had a good slip of 12.9°, within the preferred range of 10° to 15°.

Samples of the embossed laminated card of the present invention were also measured for gloss. Gloss measurements were also taken prior to lamination, and following lamination but prior to embossing, and the drop in gloss due to embossing was determined. The results are given in the following Table III. In Table III, the gloss measurements were from non-imaged areas on the card.

Samples of embossed, laminated cards were also prepared using a medium gloss film. This film was also a one-half mil thick polyethylene terephthalate film marketed as a medium gloss film by E.I. DuPont de Nemours & Co. under the trademark "Mylar". Samples were prepared by laminating the medium gloss film onto the same substrate used to prepare the high gloss embossed laminated cards of Table II. These laminated cards were also measured in the non-imaged areas, for gloss prior to embossing as well as after embossing, and the drop in gloss due to embossing was also determined. This data is given in Table III.

In Table III, gloss data is also given for non-imaged areas of the "Kem" plastic game card for purposes of comparison.

The values in Table III are average (Avg.) and standard deviation (σ).

TABLE III

GLOSS OF LAMINATED CARDS
SHEET GLOSS (NONIMAGED AREAS)

|  | Medium Gloss | | High Gloss | | 1994 Plastic Cards | |
| --- | --- | --- | --- | --- | --- | --- |
|  | Avg. | σ | Avg. | σ | Avg. | σ |
| Before Lamination | 37.86 | 0.90 | 37.86 | 0.90 | 62.56 | 1.77 |
| Laminated | 92.58 | 1.06 | 102.88 | 1.78 | | |
| Laminated Embossed | 77.40 | 3.46 | 81.78 | 1.37 | | |
| Drop in Gloss Due to Embossing | 15.18 | | 21.1 | | | |

In the above Table III, it can be seen that the high gloss laminated cards of the present invention, in the non-imaged areas, prior to embossing, had a gloss of about 102°, and that the embossing was able to reduce the gloss by about 21.1° to a value of 81.78°, well within the acceptable range of 50° to 85°. Similarly, with respect to the medium gloss film samples, the embossing was able to reduce the gloss from an unacceptable value of 92.58° to an acceptable value of 77.4°.

Gloss measurements were also made in the imaged areas of the cards of Table III. The results are given in the following Tables IV and V. The measurements were taken of the black pips (Table IV) and the red pips (Table V). As with Tables II and III, the values given are average values, along with standard deviations.

For purposes of comparison, samples were also made with low gloss films. These films were also one-half mil thick polyethylene terephthalate "Mylar" films. The samples were prepared by laminating the low gloss films on to the same substrate used to prepare the high gloss embossed laminated cards of Table II. Data for the low gloss films is also given in Tables IV and V.

TABLE IV

INK GLOSS--BLACK PIPS

|  | Low Gloss Laminated | | Medium Gloss Laminated | | High Gloss Laminated | | 1994 Plastic Cards | |
| --- | --- | --- | --- | --- | --- | --- | --- | --- |
|  | Avg. | σ | Avg. | σ | Avg. | σ | Avg. | σ |
| Before Lamination | 72.26 | 3.37 | 72.26 | 3.37 | 72.26 | 3.37 | 62.82 | 1.82 |
| Laminated | 74.74 | 0.49 | 92.28 | 1.60 | 103.00 | 2.35 | | |
| Laminated and Embossed | 59.86 | 0.90 | 75.62 | 1.73 | 84.40 | 5.89 | | |
| Drop in Gloss Due to Embossing | 14.88 | | 16.66 | | 18.60 | | | |

INK GLOSS--RED PIPS

|  | Low Gloss Semi-plastic | | Medium Gloss Semi-Plastic | | High Gloss Semiplastic | | 1994 Plastic Cards | |
| --- | --- | --- | --- | --- | --- | --- | --- | --- |
|  | Avg. | σ | Avg. | σ | Avg. | σ | Avg. | σ |
| Before Lamination | 67.80 | 2.77 | 67.80 | 2.77 | 67.80 | 2.77 | 60.46 | 3.03 |
| Laminated Unembossed | 75.40 | 0.28 | 94.12 | 0.29 | 100.62 | 1.04 | | |
| Laminated Embossed | 63.68 | 1.92 | 81.28 | 3.61 | 79.28 | 1.75 | | |
| Drop in Gloss Due to Embossing | 11.72 | | 12.84 | | | | | |

The data of Tables IV and V is particularly significant as it shows that the pip glosses following embossing, for the high gloss film samples, were higher than even prior to lamination. Prior to lamination the black and red pip glosses were 72.26° and 67.8°, respectively. Following lamination and embossing, the black and red pip glosses were 84.4° and 79.28°, respectively. This means that the high gloss films provided an excellent transmission of light and printed image.

The medium gloss films gave black and red pip glosses following embossing of 75.62° and 81.28°. Both values were also slightly better than the values of 72.26° and 67.8° prior to lamination. This data indicates that a medium gloss film also gives good transmission of light and printed image, but not as good as a high gloss film. For this reason, a high gloss film is preferred in the practice of the present invention.

The low gloss films gave black and red pip glosses following embossing of 59.86° and 63.68°, respectively. Both values were significantly poorer than the values of 72.26° and 67.8°, respectively, prior to lamination, in contrast to the results achieved with the medium and high gloss films.

The cards of Tables IV and V, which were laminated with low gloss films, were also measured for gloss in the non-imaged areas. Prior to laminating, the gloss was 37.86. After lamination, the gloss was 75.48 with a standard deviation of 1.34, and after embossing, was 58.08 with a standard deviation of 2.96.

The above means that the low gloss films can be used to avoid glare and obtain an acceptable glare. However, the low gloss films, in the imaged areas, as shown in FIGS. IV and V, gave a poorer transmission of light and printed image, following embossing, than the high or medium gloss films.

The low gloss films could be used without embossing. However, this would provide the cards with inadequate static slip to permit their use as game cards.

The pips of the samples of Tables IV and V were also measured for ink density. The ink density is determined using a Greytag Densitometer. The results are given in the following Table VI, for black pips, and Table VII, for red pips. Values are also given in Tables VI and VII for plastic "Kem" cards, for purposes of comparison.

TABLE VI

INK DENSITY OF LAMINATED CARDS
INK DENSITY--BLACK PIPS

| | Low Gloss Semi-Plastic | | Medium Gloss Semi-Plastic | | High Gloss Semiplastic | | 1994 Plastic Cards | |
|---|---|---|---|---|---|---|---|---|
| | Avg. | σ | Avg. | σ | Avg. | σ | Avg. | σ |
| Before Lamination | 2.41 | 0.02 | 2.41 | 0.02 | 2.41 | 0.02 | 2.03 | 0.09 |
| Laminated | 1.81 | 0.06 | 2.06 | 0.02 | 2.17 | 0.08 | | |
| Laminated Embossed | 1.73 | 0.01 | 1.97 | 0.07 | 2.13 | 0.07 | | |

TABLE VII

INK DENSITY--RED PIPS

| | Low Gloss | | Medium Gloss | | High Gloss | | 1994 Plastic Cards | |
|---|---|---|---|---|---|---|---|---|
| | Avg. | σ | Avg. | σ | Avg. | σ | Avg. | σ |
| Before Lamination | 2.04 | 0.02 | 2.04 | 0.02 | 2.04 | 0.02 | 2.14 | 0.08 |
| Laminated | 1.54 | 0.04 | 1.73 | 0.08 | 1.79 | 0.10 | 1.58 | |
| Laminated and Embossed | 1.58 | 0.04 | 1.80 | 0.03 | 1.88 | 0.03 | | |

In Tables VI and VII, the present invention is even more dramatically illustrated.

The ink density prior to lamination was 2.41 for the black pips and 2.04 for the red pips. The laminated and embossed images for the high gloss film samples had ink density values of 2.13 for the black pips and 1.88 for the red pips. It can be seen that the image clarity was thus essentially as good following lamination and embossing with the high gloss films as it was prior to lamination. Similarly, the laminated and embossed images for the medium gloss film samples has ink densities of 1.97 for the black pips and 1.80 for the red pips, both values being indicative of good image clarity equivalent to the image Clarity prior to lamination. In contrast, the ink densities obtained using the low gloss films were 1.73 for the black pips and 1.58 for the red pips. These values were substantially lower than the respective ink densities prior to lamination and represented substantial image clarity losses due to laminating and embossing.

Advantages of the present invention should now be apparent.

From the data of Table II, it can be seen that the laminated clear polyester films on opposite sides of a paper substrate provided a paper-based card with excellent durability and stiffness characteristics.

From the data of Tables III, IV and V, it can be seen that the high or medium gloss fills, without embossing, provided an unacceptable gloss and an irritating glare in both the imaged and non-imaged areas of a card. In both the imaged and non-imaged areas, the glosses, prior to embossing, were much higher than the glosses prior to laminating. The low gloss films provided an acceptable gloss in the finished product. However, as shown in FIGS. IV and V, the use of the low gloss films accompanied by embossing resulted in dulling of the card images. If the low gloss films are used without embossing, the cards would then have insufficient static slip to permit their use as game cards.

As shown in Tables III, IV, and V, the unacceptable gloss in either the imaged areas or non-imaged areas, using the medium or high gloss films, can be overcome by embossing the medium or high gloss films to acceptable gloss levels. Surprisingly, as shown in Tables VI and VII, the embossing of the medium or high gloss films results in a retention of distinctness, color, and ink density effective for substantially complete transmission of the original image. Little or no drop in ink density is obtained for the black pips (FIG. VI), and only a small drop is observed for the red pips (FIG. VII).

In embossing the high and medium gloss films to acceptable gloss levels, an improved static slip is obtained necessary to meet slip criteria for a game card.

From the above description of the invention, those skilled in the art will perceive improvements, changes and modifications. Such improvements, changes and modifications within the skill of the art are intended to be covered by the appended claims.

Having described the invention, the following is claimed:

1. A playing card comprising:
   a base comprising indicia printing on one side;
   a high or medium gloss clear plastic fill laminated to said one side over said indicia printing;
   said fill being mechanically embossed to provide good static slip and a Tappi gloss in the range of about 50° to about 85° and, when so embossed, good image clarity.

2. The card of claim 1 having a static slip in the range of 7° to 15°.

3. The card of claim 1 wherein said mechanical embossment is a repetitive pattern of closely spaced indentations in the plastic film applied substantially uniformly across the face of said one side.

4. The card of claim 1 wherein said plastic film laminated to said one side, prior to embossing, provides a Tappi gloss on said one side in the range of 80° to 105°.

5. The card of claim 1 wherein said base is a two-ply laminated paper stock material wherein each ply has a basis weight in the range of 60 to 70 lbs/3,300 ft² and a caliper in the range of 4.5 to 5.5 mils, said laminates being adhered together by an adhesive.

6. The card of claim 5 wherein said base is coated with a paper coating on said one side, said printing being applied to said coating, and said film is laminated over the printed coating.

7. The card of claim 1 having good image clarity in the finished card compared to the card prior to lamination.

8. The card of claim 7 having an average image ink density both before and after laminating and embossing of at least about 1.8.

9. The card of claim 1 wherein said embossing is a repetitive pattern of closely spaced shallow indentations applied in the nip of a roll machine.

10. A playing card comprising:
   (a) a base of paper stock material comprising opposite sides;
   (b) opaque paper coatings on said opposite sides of said base layer;
   (c) printing on said paper coatings;
   (d) a high gloss or medium gloss clear plastic film laminated to each of said opposite sides covering said coatings, the printing on one of said sides comprising indicia and the film on said one side being mechanically embossed to provide a static slip in the range of 7° to 15° and a Tappi gloss in the range of 50° to 85° and, when so embossed, good image clarity.

11. The card of claim 10 wherein both of said films are embossed to provide a Tappi gloss in the range of 50° to 85° and a static slip in the range of 7° to 15°.

12. The card of claim 10 wherein said embossing is a repetitive pattern of closely spaced shallow indentations in the outer surface of each of said films.

13. The card of claim 12 wherein said indentations are applied in the nip of a roll machine and cause light scatter.

14. The card of claim 10 wherein said printing comprising indicia prior to laminating has an image ink density in the range of about 1.8 to 2.4 and following embossing has an image ink density of at least about 1.8.

15. The card of claim 10 wherein said plastic films are a polyester material.

16. The card of claim 10 wherein said base is a two-ply laminated paper stock wherein each ply has a basis weight in the range of 60 to 70 lbs/3,300 ft$^2$ and a caliper in the range of 4.5 to 5.5 mils and said plys are adhered together by an adhesive.

17. The card of claim 16 having a stiffness equivalent to that of a paper card.

18. A playing card comprising:
   (a) a paper base comprising two plys adhered together by an adhesive, each ply having a basis weight in the range of 60 to 70 lbs/3,300 ft$^2$ and a caliper in the range of 4.5 to 5.5 mills;
   (b) opaque paper coatings applied to opposite sides of said paper base;
   (c) printing applied to said paper coatings having a solid ink density in the range of about 1.8 to about 2.4;
   (d) medium or high gloss clear plastic films on said opposite sides adhered to said coatings;
   (e) a uniform repetitive pattern of closely spaced small embossments across the face of each of said plastic films, said embossments being effective to provide a Tappi gloss in the range of about 50° to about 85° and a retention of image ink density to a value of at least about 1.8;
   said card having a static slip in the range of about 7° to about 15° and good image clarity.

19. The playing card of claim 18 wherein said plastic films laminated to said opposite sides, prior to embossing, provide a Tappi gloss in the range of about 85° to about 105°.

20. The playing card of claim 19 wherein said embossments are mechanically applied and are barely discernible to the naked eye.

21. The playing card of claim 20 wherein said embossments are small indentations in the plastic film applied in the nip of a roll machine.

22. The playing card of claim 21 wherein said films are polyester films.

23. A method of making a playing card comprising the steps of:
   (a) providing a paper base;
   (b) coating the opposite sides of said paper base with opaque paper coatings;
   (c) printing said opaque paper coatings;
   (d) adhering to said opposite sides over each of said paper coatings a medium or high gloss clear plastic film; and
   (e) mechanically embossing said films across the face of said films with a uniform repetitive pattern of closely spaced small embossments effective to reduce the gloss to a Tappi gloss in the range of about 50° to about 85°.

24. The method of claim 23 wherein said opaque paper coatings are printed in step (c) with an image ink density in the range of about 1.8 to about 2.4.

25. The method of claim 24 wherein said card has an image ink density following embossing of at least about 1.8.

26. The method of claim 23 wherein said card following embossing has a static slip in the range of about 7° to about 15°.

27. The method of claim 23 wherein said paper base comprises two paper laminates adhered together by an adhesive.

28. The method of claim 27 wherein each of said laminates has a base weight in the range of 60 to 70 lbs/3,300 ft$^2$ and a caliper in the range of 4.5 to 5.5 mills.

29. The method of claim 23 wherein said embossments are made in the nip of a roll machine.

* * * * *